United States Patent [19]

Ono et al.

[11] Patent Number: 4,965,120

[45] Date of Patent: * Oct. 23, 1990

[54] MAGNETIC RECORDING MEDIUM

[75] Inventors: Toshio Ono; Hiroshi Ogawa; Chiaki Mizuno; Shinji Saito, all of Kanagawa, Japan

[73] Assignee: Fuji Photo Film Co., Ltd., Kanagawa, Japan

[*] Notice: The portion of the term of this patent subsequent to Aug. 7, 2007 has been disclaimed.

[21] Appl. No.: 199,821

[22] Filed: May 27, 1988

[30] Foreign Application Priority Data

May 29, 1987 [JP] Japan ................... 62-136364

[51] Int. Cl.$^5$ ............................. G11B 23/00
[52] U.S. Cl. ..................... 428/213; 427/131; 428/323; 428/329; 428/336; 428/408; 428/694; 428/900
[58] Field of Search ............ 428/323, 329, 694, 900, 428/336, 213, 408; 427/131

[56] References Cited

U.S. PATENT DOCUMENTS

| 4,259,392 | 3/1981 | Suzuki | 428/694 |
| 4,511,617 | 4/1985 | Hideyama et al. | 428/408 |
| 4,546,038 | 10/1985 | Yamaguchi et al. | 428/694 |

Primary Examiner—Paul J. Thibodeau
Attorney, Agent, or Firm—Sughrue, Mion, Zinn, Macpeak and Seas

[57] ABSTRACT

A magnetic recording medium is described, comprising a nonmagnetic support having thereon a first magnetic layer and having on the first magnetic layer a second magnetic layer, in that order, said second magnetic layer comprising a magnetic particle, a binder, abrasive particles and carbon black having an average primary particle diameter of 80 m$\mu$ or more, said first magnetic layer comprising a magnetic particle, a binder and carbon black having an average primary particle diameter of 40 m$\mu$ or less without substantially containing abrasive particles in the first magnetic layer, and the thickness ratio of the first layer to the second layer, first layer thickness/second layer thickness is 1.8 or more.

6 Claims, No Drawings

MAGNETIC RECORDING MEDIUM

FIELD OF THE INVENTION

This invention relates to a magnetic recording medium, and particularly it relates to an improved magnetic recording medium having at least two magnetic layers.

BACKGROUND OF THE INVENTION

Generally, a magnetic recording medium comprising a non-magnetic support having thereon a magnetic layer containing ferromagnetic particles dispersed in a binder is used as a magnetic recording medium for audio recording, video recording and for computers.

Carbon black is conventionally contained in the magnetic layer of such a magnetic recording medium for preventing the static electrification of the magnetic layer. An average primary particle diameter of carbon black is generally from 10 to 150 m$\mu$ (milli micron). It is generally considered that when carbon black having a small particle size is used, the surface of the thus obtained magnetic layer becomes smooth, but running durability becomes poor. On the other hand, when carbon black having a large particle size is used, running durability becomes excellent but surface smoothness becomes poor, which results in undesirably deteriorating electromagnetic properties and particularly S/N in the case of a video tape. For solving the above problem, it has been proposed in Japanese Patent Publication Nos. 9041/79, 20203/78 and Japanese Patent Application (OPI) No. 218039/83 (the term "OPI" as used herein means a "published unexamined Japanese patent application"), that carbon black having different average primary particle sizes be added in a magnetic layer when the magnetic layer is a single layer, but a magnetic recording medium having both satisfactory running durability and electromagnetic properties can not be obtained.

On the other hand, when a magnetic layer is a multiple layer having at least two layers, a method for preparing a magnetic recording medium having excellent running durability as well as excellent electromagnetic properties is disclosed in Japanese Patent Application (OPI) No. 200425/83. That is, the magnetic layer is composed of two magnetic layers, and only the second magnetic layer (upper layer) contains carbon black to improve running durability. The first magnetic layer (under layer) does not contain carbon black so as to increase packing density of magnetic particles in magnetic layer, whereby electromagnetic properties are improved. However, the above described magnetic tape has such small carbon black particles (i.e., average primary particle diameter is 30 m$\mu$) contained only in the upper layer and satisfactory running durability cannot yet be obtained.

Accordingly, it cannot be said that the above method can produce a magnetic recording medium sufficiently excellent in running durability as well as in electromagnetic properties.

SUMMARY OF THE INVENTION

An object of this invention is to provide a magnetic recording medium having at least two magnetic layers and having excellent electromagnetic properties and running durability.

That is, this invention relates to a magnetic recording medium comprising a non-magnetic support having thereon a first magnetic layer and having on the first magnetic layer a second magnetic layer, in that order, wherein said second magnetic layer comprises a magnetic particle, a binder, abrasive particles and carbon black having an average primary particle diameter of 80 m$\mu$ or more, the first magnetic layer comprises a magnetic particle, a binder and carbon black having an average primary particle diameter of 40 m$\mu$ or less without substantially containing abrasive particles in the first magnetic layer, and the thickness, ratio of the first layer to the second layer, (first layer thickness/second layer thickness) is 1.8 or more.

DETAILED DESCRIPTION OF THE INVENTION

This invention comprises the above described first magnetic layer (under layer) and the second magnetic layer (upper layer). The combination of these two layers has made it possible to improve running durability without deteriorating electromagnetic properties.

That is, in the magnetic recording medium comprised the first and the second magnetic layers, surface smoothness can be assured mainly by the first magnetic layer and durability can be assured mainly by the second magnetic layer. In this case, even though the k5 second magnetic layer contains carbon black having a comparatively large particle size and abrasive particles it can have a smooth surface, since the surface of the first magnetic layer which takes a role of a support for the second magnetic layer is smooth and additionally the second magnetic layer is thinner than the first magnetic layer. In accordance with the above reasons, both first and second magnetic layers can have excellent electromagnetic properties. Also, since the first magnetic layer contains carbon black which is small enough not to affect the surface smoothness thereof, the antistatic properties and running durability can be further improved.

Thus, this invention has made it possible to provide a magnetic recording medium having excellent electromagnetic properties as well as running durability by the above described constitution.

In the magnetic recording medium of this invention, a first magnetic layer containing carbon black having an average primary particle diameter of 40 m$\mu$ or less without substantially containing abrasive particles is provided on the surface of a non-magnetic support, a second magnetic layer containing carbon black having an average primary particle diameter of 80 m$\mu$ or more and abrasive particles is provided thereon and the thickness ratio of the first and second magnetic layer (first magnetic layer/second magnetic layer) is 1.8 or more.

That is, since the first magnetic layer (under layer) contains small size carbon black having an average primary particle diameter of 40 m$\mu$ or less, preferably from 10 to 40 m$\mu$, and particularly preferably from 20 to 35 m$\mu$ and does not substantially contain abrasive particles the surface thereof becomes extremely smooth. As the second magnetic layer (upper layer) contains comparatively large size carbon black having an average primary particle diameter of 80 m$\mu$ or more, preferably from 80 to 150 m$\mu$ and particularly preferably from 85 to 140 m$\mu$ and abrasive particles, providing excellent running durability. Also, it is necessary in this invention that the thickness ratio of the first magnetic layer to the second magnetic layer (first magnetic layer/second magnetic layer) is 1.8 or more. Preferably, the thickness ratio of first magnetic layer to second magnetic layer is from 1.8 to 50.0 and particularly from 2.0 to 40.0.

Further, preferably the thickness of the second magnetic layer is from 0.1 to 2.0 μm and particularly from 0.2 to 1.5 μm, and the thickness of the first magnetic layer is from 1.0 to 7.0 μm and particularly from 1.5 to 6.0 μm.

That is, highly smooth surface of the first magnetic layer makes it possible to realize a surface smoothness of the second magnetic layer containing comparatively large carbon black particles and abrasive particles by making the first magnetic layer thicker than the second magnetic layer, satisfying the above described relation. For the above reasons, the second magnetic layer assures a surface smoothness, excellent electromagnetic properties and also excellent running durability. Further, since the first magnetic layer contains carbon black which is small enough not to affect the smoothness thereof, both antistatic properties and running durability can be further improved.

As described above, a magnetic recording medium having excellent electromagnetic properties and durability can be obtained by assuring, particularly, smoothness in the first magnetic layer and, particularly, durability in the second magnetic layer.

Carbon black is present in the range of preferably from 0.1 to 15 parts by weight and more preferably from 0.5 to 10 parts by weight, per 100 parts by weight of ferromagnetic particles in each magnetic layer of the magnetic recording medium of this invention. If the content of carbon black is smaller than the above, the antistatic effect is insufficient and if it is larger than the above, the surface smoothness of the magnetic layer is deteriorated.

Examples of carbon black for use in these two magnetic layers (i.e., the first and second magnetic layer) are carbon black having the above described particle diameters, such as "Asahi Thermal #35" (particle diameter: 115 mμ), "Asahi Thermal #60" (particle diameter: 51 mμ), "Asahi Thermal #60H" (particle diameter: 35 mμ), (manufactured by Asahi Carbon Co., Ltd.); "Conductex SC" (particle diameter: 20 mμ ) and "Raven 410" (particle diameter: 70 mμ) (manufactured by Columbian Carbon Co., Ltd.); "Vulcan XC-72 (Particle diameter: 30 mμ) (manufactured by Cabot Co., Ltd.); and "Dia Black" (particle diameter: 85 mμ) (manufactured by Mitsubishi Chemical Industries Ltd.).

The above-described example are carbon black of which trade names are known, and any carbon black can be used so long as such carbon black meets the requirement as to the average primary particle diameter. The above carbon black can be used in which more than one particle size is present in combination.

The weight ratio of magnetic particles and a binder contained in the first and the second magnetic layers of this invention (i.e., magnetic particles/binder) is preferably from 2.5 to 10.0, and more preferably from 3.0 to 8.0. Further, it is preferred that the difference in the weight ratio between the first magnetic layer and the second magnetic layer is 5 or less and particularly from 1 to 4.0.

The magnetic recording medium of this invention can be prepared, for example, by the following method.

After a first magnetic layer is coated on a nonmagnetic support, the magnetic layer is subjected to a magnetic orientation and calendering treatment, and then, a second magnetic layer is coated thereon and is subjected to a magnetic orientation and calendering treatment similar to the first magnetic layer to form the magnetic layers of this invention. That is, a method for preparing the magnetic recording medium of this invention is described in Japanese Patent Application (OPI) No. 27410/78.

The non-magnetic supports used in this invention are films or sheets made of polyesters such as polyethylene terephthalate (PET), or polyethylene naphthalate; polyolefins such as polypropylene; cellulose derivatives such as cellulose diacetate or cellulose triacetate; vinyl type resins such as polyvinyl chloride or polyvinylidene chloride; synthetic resins such as polycarbonate, polyamide, polyamide imide or polyimide; non-magnetic metal foils such as aluminum or copper; metal foils such as a stainless steel foil; and ceramic sheets.

The magnetic layer of the magnetic recording medium in this invention is a layer containing ferromagnetic particles dispersed in a binder. The magnetic particles used in this invention are not particularly limited. Examples of magnetic particles are conventionally known ferromagnetic particles such as $\gamma-Fe_2O_3$, FeOx (1.33 = X <1.5), Co-containing $\gamma-Fe_2O_3$, Co-containing FeOx (1.33< X <1.5), $Fe_3O_4$, Co-containing $Fe_3O_4$, $CrO_2$, Co—Ni—P alloy, or Co—Ni alloy.

It is necessary that abrasive particles are added in the second magnetic layer to improve the above described durability. But abrasive particles are not substantially added in the first magnetic layer in order to ensure the surface smoothness thereof. The sentence "abrasive particles are not substantially added in the first magnetic layer" means that an amount of the abrasive particles added in the first magnetic layer is preferably 0.3 part by weight or less, more preferably 0.1 part by weight or less and most preferably 0 part by weight per 100 parts by weight of the magnetic particles.

The abrasive agent is not particularly limited but these agents having a Mohs' hardness of 6 or more are preferably used and these having a Mohs' hardness of 8 or more are particularly preferred. Examples of abrasive agents are MgO (Mohs' hardness of 6), $Cr_2O_3$ (Mohs' hardness of 8.5), $\alpha-Al_2O_3$ (Mohs' hardness of 9), $\gamma-Al_2O_3$ (Mohs' hardness of from 7 to 8), SiC ($\alpha$ or $\beta$, Mohs' hardness of 9.5). Among these, $\alpha-Al_2O_3$ is preferred.

The particle size of the abrasive particles is preferably from 0.01 to 1.5 μm and more preferably from 0.10 to 0.80 μm. The content of the abrasive Particles used in the second magnetic layer is preferably from 0.5 to 10 parts by weight and more preferably from 1 to 5 parts by weight per 100 parts by weight of magnetic particles. If desired, these abrasive particles having different kinds of particles and different particle sizes may be mixed together. The above-mentioned abrasive particles are particularly preferably used in the second magnetic layer.

The binder solution used for preparing a magnetic coating composition of this invention is a binder solution containing resin components and a solvent, and lubricating agents, etc., if desired.

The resin components used in this invention include conventionally known thermoplastic resins, thermosetting resins, reactive type resins or mixtures thereof. Examples of resin components include copolymers of the vinyl chloride type (e.g., a copolymer of vinyl chloride and vinyl acetate, a copolymer of vinyl chloride, vinyl acetate and vinyl alcohol, a copolymer of vinyl chloride, vinyl acetate and acrylic acid, a copolymer of vinyl chloride and vinylidene chloride, a copolymer of vinyl chloride and acrylonitrile, a copolymer of ethylene and vinyl acetate, and a copolymer of vinyl chloride type having therein a polar group such as —SO$_3$Na or —SO$_2$Na and an epoxy group); cellulose derivatives (such as cellulose resins); acrylic resins; polyvinyl acetal resins; polyvinylbutyral resins; epoxy resins; phenoxy resins; and polyurethane type resins (e.g., polyester polyurethane resins, polyurethane type resins having therein a polar group such as —SO$_3$Na or —SO$_2$Na, and polycarbonate polyurethane resins).

When a hardening agent is used, polyisocyanate compounds are generally used. The polyisocyanate compounds are selected from polyurethane type resins, etc., generally used as a hardening agent.

When hardening treatment is conducted by electron exposure, compounds having a reactive double bond (e.g., urethane acrylate) can be used.

The examples of solvents used for preparing a magnetic coating composition include ketones such as acetone, methyl ethyl ketone, methyl isobutyl ketone, ethyl isobutyl ketone or cyclohexanone; esters such as methyl acetate, ethyl acetate, butyl acetate or monoethyl ether of glycol acetate; glycol ethers such as ether, glycol dimethyl ether or dioxane; aromatic hydrocarbons such as benzene, toluene or xylene; and chlorinated hydrocarbons such as methylene chloride, ethylene chloride, carbon tetrachloride, chloroform, ethylene chlorohydrin or dichlorobenzene. These solvents can be used alone or in combination. Of these solvents, polar solvents such as ketones or solvents containing polar solvents are particularly preferred.

Upon preparing a magnetic coating composition, magnetic particles can be uniformly mixed, kneaded and dispersed with a binder solution. Upon mixing, generally kneading and dispersing, a two-roll mill, a three-roll mill, an open kneader, a kneader under pressure or a continuous kneader may be used for pre-dispersing and then a sand grinder or a ball mill may be used for postdispersing.

It is needless to say that additives such as lubricating agents, dispersing agents, etc., may be optionally added into the magnetic coating composition.

For coating the magnetic coating composition, an air doctor coating method, a blade coating method, a rod coating method, an extruding coating method, an air knife coating method, a squeeze coating method, an impregnating method, a reverse roll coating method, a transfer roll coating method, a gravure coating method, a kiss coating method, a cast coating method, a spray coating method or a spin coating method can be used.

The method for preparing a magnetic recording medium having two magnetic layers (upper and under layers) has been hereinbefore described, and as long as a magnetic recording medium contains two magnetic layers having the above-described characteristics, additional magnetic layers may be present to make a recording material having three or more (i.e., multiple) magnetic layers.

The present invention is illustrated more specifically by the following Examples and Comparative Examples. In each Example and Comparative Example, all parts percents, ratios and the like are by weight, unless otherwise specified.

An Example and Comparative Example for preparing a Phillips type compact casette tape are illustrated

EXAMPLE 1

| Coating composition for a first magnetic layer: | |
|---|---|
| Co-γ Fe$_2$O$_3$ (Hc: 680 Oe, BET method specific surface area: 30 m$^2$/g) | 100 parts |
| Copolymer of vinyl chloride, vinyl acetate and vinyl alcohol (component ratio: 92/3/5, degree of polymerization: 600) | 10 parts |
| Polyester polyurethane resin ("Crisvon 7209" manufactured by DAINIPPON INK AND CHEMICALS, INC.) | 7 parts |
| Lauric acid | 2.0 parts |
| Carbon black (average primary particle size: 20 mμ, "CONDUCTEX SC" manufactured by Columbia Carbon Co., Ltd.) | 2.0 parts |
| Polyisocyanate ("Collonate L-75" manufactured by Nippon Polyurethane Co., Ltd.) | 5 parts |
| Butyl acetate | 300 parts |
| Coating composition for a second magnetic layer: | |
| Co-γ Fe$_2$O$_3$ (Hc: 720 Oe, BET method specific surface area: 30 m$^2$/g) | 100 parts |
| Copolymer of vinyl chloride, vinyl acetate and vinyl alcohol (components ratio 92/3/5, degree of polymerization: 600) | 16 parts |
| Polyester polyurethane resin ("Crisvon 7209" manufactured by DAINIPPON INK AND CHEMICALS, INC.) | 4 parts |
| Lauric acid | 2.0 parts |
| Carbon black (average primary particle size: 85 mμ, "Dia Black G" manufactured by Mitsubishi Chemical Industries Ltd.) | 2.0 parts |
| α-Al$_2$O$_3$ (particle diameter: 0.5 μm) | 1.0 part |
| Polyisocyanate ("Collonate L-75", manufactured by Nippon Polyurethane Co., Ltd.) | 5 parts |
| Butyl acetate | 300 parts |

Regarding the above two compositions, each components except for polyisocyanate was mixed, kneaded and dispersed using a sand mill. Then, polyisocyanate was added thereto and mixed and dispersed for 20 minutes. The thus obtained dispersion was filtered using a filter having an average pore diameter of 1 μm to obtain a magnetic coating composition.

The thus obtained magnetic coating composition for a first magnetic layer was coated using a reverse roll on a polyethylene terephthalate support having a thickness of 7 μm and travelling at a rate of 60 m/min., so that the dry thickness was 4 μm, and was subjected to orientation using magnets of 1500 gauss while the thus coated magnetic layer was wet, and then was dried and subjected to super calendering treatment. Thereafter, the magnetic coating composition for a second magnetic layer was coated in a dry thickness of 1.5 μm using a reverse roll, and was subjected to orientation using the above magnets while the magnetic layer was wet, and dried and subjected to super calendering treatment, and then was slit to a width of 3.81 mm and enclosed in a cassette to prepare a Phillips type compact cassette tape.

EXAMPLE 2

The same procedure as in Example 1 was repeated to prepare a Phillips type compact cassette tape, except that in Example 1 carbon black #60H (average primary particle size: 35 mμ, manufactured by Asahi Carbon Co., Ltd.) was used in the magnetic coating composition for the first magnetic layer and that carbon black #35 (average particle size 115 mμ, manufactured by Asahi Carbon Co., Ltd.) was used.

COMPARATIVE EXAMPLE 1

The same procedure as in Example 1 was repeated to prepare a Phillips type compact cassette tape, except that no carbon black was added in the coating composition for the first magnetic layer and that carbon black "Raven 410) manufactured by Columbia Carbon Co., Ltd. having an average primary particle size of 70 mμ was used in the coating composition for the second magnetic layer.

COMPARATIVE EXAMPLE 2

The same procedure as in Example 2 was repeated to prepare a Phillips type compact cassette tape, except that no carbon black was used in the coating composition for the first magnetic layer.

COMPARATIVE EXAMPLE 3

The same procedure as in Example 1 was repeated to prepare a Phillips type compact cassette tape except that carbon black "Raven 410" manufactured by Columbia Carbon Co., Ltd. having an average primary particle size of 70 mμ was used instead of carbon black used in the coating composition of Example 1 for the second magnetic layer.

COMPARATIVE EXAMPLE 4

The same procedure as in Example 1 was repeated to prepare a Phillips type compact cassette tape, except that carbon black #60 (average primary particle size 51 mμ: manufactured by Asahi Carbon Co., Ltd.) was used instead of carbon black used in the coating composition of Example 1 for the first magnetic layer and that carbon
black #35 (average primary particle size 115 mμ: manufactured by Asahi carbon Co., Ltd.) was used instead of carbon black used in the magnetic coating composition of Example 1 for the second magnetic layer.

COMPARATIVE EXAMPLE 5

The same procedure as in Example 1 was repeated to prepare a Phillips type compact cassette tape, except that carbon black #35 (average primary particle size 115 mμ manufactured by Asahi Carbon Co., Ltd.) was used instead of carbon black used in the coating composition of Example 1 for the first magnetic layer and that carbon black "Conductex SC" (average primary particle size 20 mμ; manufactured by Columbia Carbon Co., Ltd.) was used instead of carbon black used in the coating composition of Example 1 for the second magnetic layer.

COMPARATIVE EXAMPLE 6

The same procedure as in Example 1 was repeated to prepare a Phillips type compact cassette tape, except that the thickness of the first magnetic layer was made 3 μm instead of 4 μm and that the thickness of the second magnetic layer was made 2.5 μm instead of 1.5 μm.

Regarding the Phillips type compact cassette tapes obtained in Examples and Comparative Examples, the physical properties thereof were measured by the following method. The results are shown in Table 1.

Measuring method (1) SOL 10 kHz:

Using a commercially available tape deck ("582 Type" manufactured by Nakamichi Co., Ltd.), "SOL" is shown in terms of relative values in case when the sensitivity (10 kHz) of "FR-II" manufactured by Fuji Photo Film Co., Ltd. at a high position was assumed to be 0 dB.

(2) Decrease of output:

Using a commercially available tape deck ("582 Type" manufactured by Nakamichi Co., Ltd.), signals at 10 kHz were recorded for 45 minutes length. Then, signals were reproduced for 20 times, and output was measured each time. The decrease of output is shown by a relative value of the output measured at 20th time when the output of the first reproduction is assumed to be 0 dB.

The decrease of output was evaluated by the following three grade evaluation.

AA: Decrease of output: from 0 to 0.5 dB
BB: Decrease of output: from 0.6 to 1.0 dB
CC: Decrease of output: more than 1.0 dB (3) Running durability:

Running test of the obtained cassette tapes was carried out using 40 audio casette decks for the commercial use. After repeated run for 100 passes, the appearance of the tape which was wound (i.e., the disorder) and the existance of stop in running were observed and were evaluated by the following evaluation.

AA: The running of the all decks (i.e., 40 sample tapes) was stopped with the disorder of the tape which was wound.
BB: Though the running was not stopped, the disorder of the tape which was wound occured in 1 to 3 tapes among 40 tapes.
CC: The disorder of the tape which was wound occured in 4 to 6 tapes among 40 tapes, and the running was stopped in 1 to 2 tapes among 40 tapes.

TABLE 1

|  | Average primary particle size of carbon black (mμ) | | SOL 10 kHz (dB) | Decrease of output | Running Durability |
|---|---|---|---|---|---|
|  | First layer | Second layer |  |  |  |
| Example 1 | 20 | 85 | 0.8 | AA | AA |
| Example 2 | 35 | 115 | 0.6 | AA | AA |
| Comparative Example 1 | — | 70 | 1.0 | CC | CC |
| Comparative Example 2 | — | 115 | 0.8 | CC | BB |
| Comparative Example 3 | 20 | 70 | 0.7 | BB | CC |
| Comparative Example 4 | 50 | 115 | 0.0 | AA | AA |
| Comparative Example 5 | 115 | 20 | −1.0 | BB | CC |
| Comparative Example 6 | 20 | 85 | −0.2 | AA | AA |

Regarding the thickness of layers in Example 1 to Comparative Example 5; the thickness of the first layers was 4 μm and thickness of the second layers was 1.5 μm, and in Comparative Example 6; the thickness of the first layer was 3 μm, and the thickness of the second layer was 2.5 μm.

It is clear from the results shown in Table 1, that in Examples 1 and 2, both sensitivities and decrease of output were excellent and electromagnetic properties (e.g., decrease of output) as well as running durability were also superior.

On the other hand, in Comparative Examples 1 and 2 containing no carbon black in the first layer (under layer) although sensitivities were excellent a great decrease of output was exhibited. In Comparative Example 3 using carbon black having comparatively small particle size in the second layer (upper layer), although sensitivities were excellent, a slight decrease of output was exhibited and particularly running durability had problems.

In Comparative Example 4 using carbon black of large particle size in the first layer, the lack of a decrease of output was excellent, but sensitivity was deteriorated and electromagnetic properties had some problems. In Comparative Example 5 using large carbon black particles in the first layer and small carbon black particles in the second layer, which is contrary to the Examples of the present invention, both sensitivity and decrease of output are deteriorated, and electromagnetic properties as well as running durability had problems.

In Comparative Example 6 which had a second layer which was thicker than the first layer, electromagnetic properties had some problems.

Examples and Comparative Examples for preparing a video tape are illustrated below.

| EXAMPLE 3 | |
|---|---|
| Coating composition for a first magnetic layer: | |
| Co-γ Fe$_2$O$_3$ | 100 parts |
| (Hc: 600 Oe, | |
| BET method specific surface area: 30 m$^2$/g) | |
| Copolymer of vinyl chloride, | 10 parts |
| vinyl acetate and maleic | |
| anhydride | |
| (component ratio: 87/8/5, | |
| degree of polymerization: 600) | |
| Polyester polyurethane resin | 7 parts |
| ("Crisvon 7209" manufactured by | |
| DAINIPPON INK AND CHEMICALS, INC.) | |
| Stearic acid | 3.0 parts |
| Butyl stearate | 1.0 part |
| Carbon black | 2.0 parts |
| (average primary particle size: | |
| 20 mμ, | |
| "Conductex SC" manufactured by | |
| Columbia Carbon Co., Ltd.) | |
| Polyisocyanate | 5 parts |
| ("Collonate L-75" manufactured | |
| by Nippon Polyurethane Co., Ltd.) | |
| Butyl acetate | 300 parts |
| Coating composition for a second magnetic layer: | |
| Co-γ Fe$_2$O$_3$ | 100 parts |
| (Hc: 700 Oe, | |
| BET method specific surface area: | |
| 40 m$^2$/g) | |
| Copolymer of vinyl chloride | 10 parts |
| vinyl acetate and maleic | |
| anhydride | |
| (component ratio: 87/8/5, | |
| degree of polymerization: 600) | |
| Polyester polyurethane resin | 7 parts |
| ("Crisvon 7209", manufactured by | |
| DAINIPPON INK AND CHEMICALS, INC.) | |
| Stearic acid | 3.0 parts |
| Butyl stearate | 1.0 part |
| Carbon black | 2.0 parts |
| (average primary particle size: | |
| 85 mμ; | |
| "Dia Black G" manufactured by Mitsubishi | |
| Chemical Industries Ltd.) | |
| α-Al$_2$O$_3$ | 1.0 part |
| (average particle size 0.3 μm) | |
| Polyisocyanate | 5 parts |
| -continued EXAMPLE 3 | |
| ("Collonate L-75", manufactured by | |
| Nippon Polyurethane Co., Ltd.) | |
| Butyl acetate | 300 parts |

Regarding the above two compositions, each component, except polyisocyanate, was mixed, kneaded and dispersed using a sand mill. Then, polyisocyanate was added thereto and mixed and dispersed for 20 minutes. The thus obtained dispersion was filtered using a filter having an average pore diameter of 1 μm to obtain a magnetic coating composition.

The thus obtained magnetic coating composition for the first magnetic layer was coated in a dry thickness of 3.0 μm using a reverse roll on a polyethylene terephthalate support having a thickness of 15 μm and travelling at a rate of 60 m/min., and was subjected to orientation using magnets of 1500 gauss while the thus coated magnetic layer was wet, and then dried and subjected to super calendering treatment. Thereafter, the magnetic coating composition for a second magnetic layer was coated in a dry thickness of 1.5 μm using a reverse roll, and was subjected to orientation using the above magnets while the magnetic layer was wet, and dried and subjected to supercalendering treatment, and then was slit to a width of 1/2 inch to prepare a video tape.

EXAMPLE 4

The same procedure as in Example 3 was repeated to prepare a video tape except that #60 H (average primary particle size 35 mμ, manufactured by Asahi Carbon Co., Ltd.) was used instead of carbon black used in the coating composition of Example 3 for the first magnetic layer and that #35 (average primary particle size 115 mμ; manufactured by Asahi Carbon Co., Ltd.) was used instead of carbon black used in the coating composition of Example 3 for the second magnetic layer.

COMPARATIVE EXAMPLE 7

The same procedure as in Example 3 was repeated to prepare a video tape, except that no carbon black was used in the coating composition for the first magnetic layer in Example 3 and that "Raven 410" (average primary particle diameter 70 mμ; manufactured by Columbia Carbon Co., Ltd.) was used instead of carbon black used in the coating composition of Example 3 for the second magnetic layer.

COMPARATIVE EXAMPLE 8

The same procedure as in Example 4 was repeated to prepare a video tape, except that no carbon black was used in the coating composition for the first magnetic layer in Example 4.

COMPARATIVE EXAMPLE 9

The same procedure as in Example 3 was repeated to prepare a video tape except that "Raven 410" (average primary particle size 70 mμ; manufactured by Columbia Carbon Co., Ltd.) was used instead of carbon black used in the coating composition for the second magnetic layer in Example 3.

COMPARATIVE EXAMPLE 10

The same procedure as in example 3 was repeated to prepare a video tape, except that #60 (average primary particle size 51 mμ, manufactured by Asahi Carbon Co., Ltd.) was used instead of carbon black used in the coating composition of Example 3 for the first magnetic layer and that #35 (average primary particle size 115 mµ, manufactured by Asahi Carbon Co., Ltd.) was used instead of carbon black used in the coating composition of Example 3 for the second magnetic layer.

COMPARATIVE EXAMPLE 11

The same procedure as in Example 3 was repeated to prepare a video tape except that #35 (average primary particle size 115 mµ, manufactured by Asahi Carbon Co., Ltd.) was used instead of carbon black used in the coating composition for the first magnetic layer in Example 3 and that "Conductex SC" (average primary particle size 20 mµ; manufactured by Columbia Carbon Co., Ltd.) was used instead of carbon black used in the coating composition of Example 3 for the second magnetic layer.

COMPARATIVE EXAMPLE 12

The same procedure as in Example 3 was repeated to prepare a video tape, except that the thickness of the first magnetic layer was changed to 2.5 µm instead of 3 µm and that the thickness of the second magnetic layer was changed from 1.5 µm to 2 µm.

The physical properties of the video tapes obtained in the above Examples and Comparative Examples were checked in the following manner. The results are shown in Table 2.

Measuring method:

(1) Video output:

Video output is shown in terms of relative values when a VHS type video cassette tape "Super HG" manufactured by Fuji Photo Film Co., Ltd. is assumed to have 0 dB (629 kHz).

(2) Drop out:

Signals at 5 MHz were recorded for 10 minutes on the thus obtained video tapes at 6 m/sec. of a relative speed of a tape and a head with 60 µm of a head track width, and after the recorded signals were reproduced for 25 times occurrences of drop out (1.5 µ sec (microsecond), -18 dB) were counted for 1 minute.

(3) Running durability: Running test of the obtained cassette tapes was carried out using 40 audio casette decks for the commercial use. After repeated run for 100 passes, the appearance of the tape which was wound (i.e., the disorder) and the existance of stop in running were observed and were evaluated by the following evaluation.

AA: The running of the all decks (i.e., 40 sample tapes) was stopped with the disorder of the tape which was wound.

BB: Though the running was not stopped, the disorder of the tape which was wound occured in 1 to 3 tapes among 40 tapes.

CC: The disorder of the tape which was wound occured in 4 to 6 tapes among 40 tapes, and the running was stopped in 1 to 2 tapes among 40 tapes.

The results measured by the above method are shown in Table 2.

TABLE 2

| | Average primary particle size of carbon black (mµ) | | Video Output (dB) | Number of Occurrences of drop out per minute | Running durability |
|---|---|---|---|---|---|
| | First layer | Second layer | | | |
| Example 3 | 20 | 85 | 1.7 | 15 | AA |
| Example 4 | 35 | 115 | 1.5 | 10 | AA |
| Comparative Example 7 | — | 70 | 2.0 | 135 | CC |
| Comparative Example 8 | — | 115 | 1.8 | 110 | BB |
| Comparative Example 9 | 20 | 70 | 1.8 | 60 | CC |
| Comparative Example 10 | 50 | 115 | 0.6 | 8 | AA |
| Comparative Example 11 | 115 | 20 | −0.1 | 85 | CC |
| Comparative Example 12 | 20 | 85 | 0.4 | 12 | AA |

In Example 3 to Comparative Example 11, the first layer had a thickness of 3 µm and the second layer had a thickness of 1.5 µm and in Comparative example 12, the first layer had a thickness of 2.5 µm and the second layer had a thickness of 2 µm.

It is clearly seen from the results of Table 2 that in Examples 3 and 4, both video output and drop out were excellent and both electromagnetic properties and running durability are also excellent.

On the other hand, regarding comparative examples, in Comparative Examples 7 and 8 containing no carbon black in the first layer (under layer), video output were good, but drop out occurred quite often. In Comparative Example 9 using comparatively small carbon black particles used in the second layer (upper layer), video output was excellent but drop out occurred often and running durability had some problem.

In Comparative Example 10 using carbon black having a large particle size in the first layer, drop out was excellent, but video output is deteriorated and electromagnetic properties had some problems. In Comparative Example 11 using carbon black having a large particle size in the first layer and using carbon black having a small particle size in the second layer, as is contrary to the Examples, drop out occurred quite often and video output is deteriorated and electromagnetic properties as well as running durability had some problems.

In Comparative Example 12, when the second layer was thicker than the first layer, the electromagnetic properties had some problems.

What is claimed is:

1. A magnetic recording medium comprising a nonmagnetic support having thereon a first magnetic layer and having on the first magnetic layer a second magnetic layer, in that order, said second magnetic layer comprising a magnetic particle, a binder abrasive particles and carbon black having an average primary particle diameter of 80 mµ or more, said first magnetic layer comprising a magnetic particle, a binder and carbon black having an average primary particle diameter of 40 mµ or less without substantially containing abrasive particles in the first magnetic layer, and the thickness ratio of the first layer to the second layer, first layer thickness/second layer thickness is 1.8 or more.

2. The magnetic recording medium as claimed in claim 1, wherein the first and the second magnetic layers contain said carbon black in a range of from 0.1 to 15 parts by weight per 100 parts by weight of magnetic particles contained in each magnetic layer.

3. The magnetic recording medium as claimed in claim 1, wherein the second magnetic layer has a layer thickness of from 0.1 to 2.0 μm.

4. The magnetic recording medium as claimed in claim 1, wherein the abrasive particles contained in the second magnetic layer are α—$Al_2O_3$.

5. The magnetic recording medium as claimed in claim 1, wherein the abrasive particles in the second magnetic layer have a particle size of from 0.01 to 1.5 μm.

6. The magnetic recording medium as claimed in claim 1, wherein the content of the abrasive particles used in the second magnetic layer is from 0.5 to 10 parts by weight per 100 parts by weight of the magnetic particle.

* * * * *

UNITED STATES PATENT AND TRADEMARK OFFICE
CERTIFICATE OF CORRECTION

PATENT NO. : 4,965,120

DATED : OCTOBER 23, 1990

INVENTOR(S) : TOSHIO ONO, HIROSHI OGAWA, CHIAKI MIZUNO, SHINJI SAITO

It is certified that error appears in the above-identified patent and that said Letters Patent is hereby corrected as shown below:

column 12, line 59, delete "m$\mu$or", insert --m$\mu$ or--.

column 12, line 62, delete "m$\mu$or", insert --m$\mu$ or--.

Signed and Sealed this

Twelfth Day of May, 1992

Attest:

DOUGLAS B. COMER

*Attesting Officer*    *Acting Commissioner of Patents and Trademarks*